J. A. GLENN.
MOTOR CAR WHEEL.
APPLICATION FILED JAN. 9, 1912.
1,063,530.
Patented June 3, 1913.
2 SHEETS—SHEET 1.
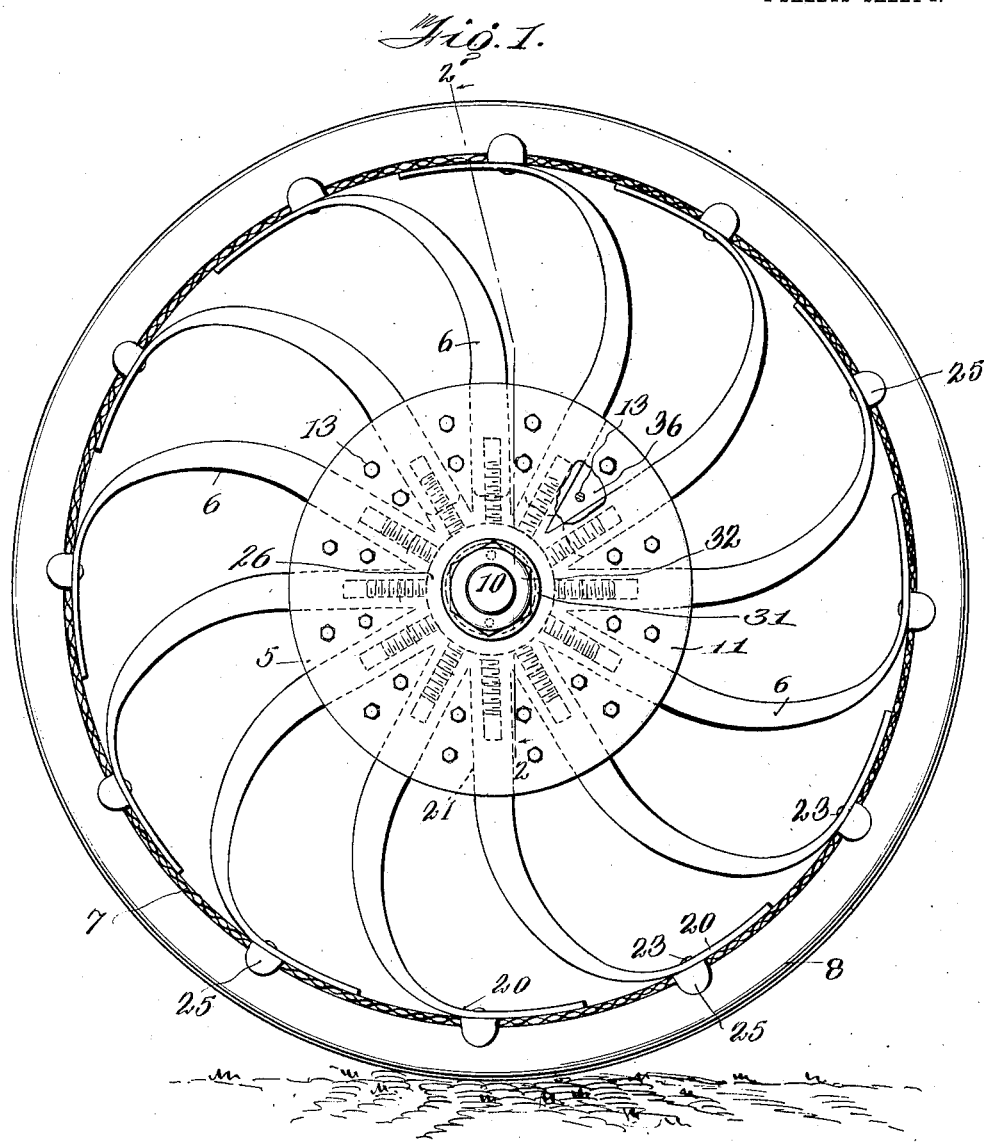
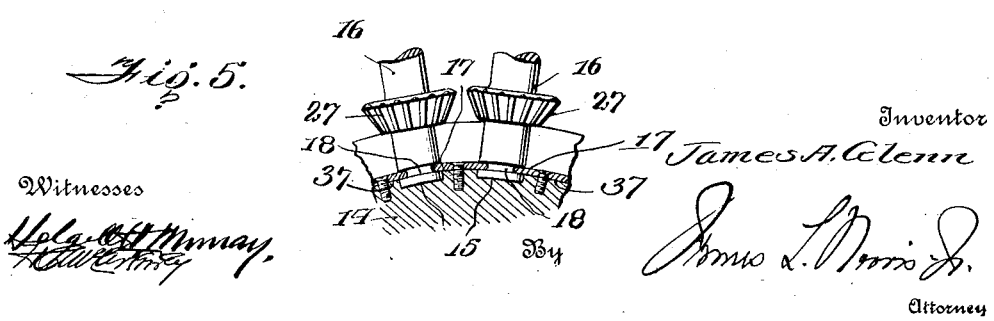

J. A. GLENN.
MOTOR CAR WHEEL.
APPLICATION FILED JAN. 9, 1912.
1,063,530.
Patented June 3, 1913.
2 SHEETS—SHEET 2.
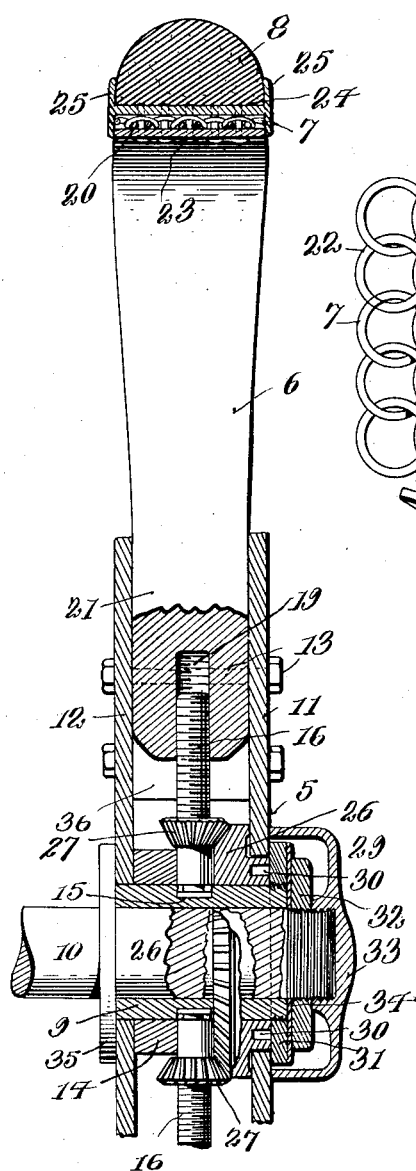
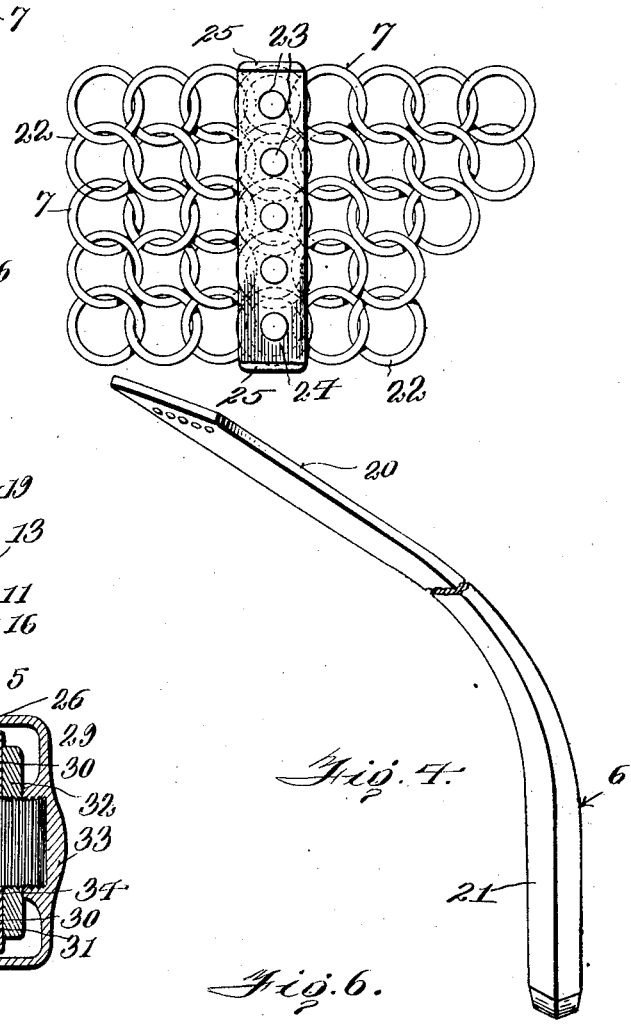
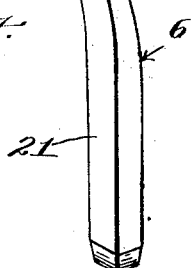
Witnesses
Inventor
James A. Glenn
By
Attorney

UNITED STATES PATENT OFFICE.

JAMES A. GLENN, OF ALBANY, NEW YORK.

MOTOR-CAR WHEEL.

1,063,530.  Specification of Letters Patent.  Patented June 3, 1913.

Application filed January 9, 1912. Serial No. 670,337.

*To all whom it may concern:*

Be it known that I, JAMES A. GLENN, a citizen of the United States, residing at Albany, in the county of Albany and State of New York, have invented new and useful Improvements in Motor - Car Wheels, of which the following is a specification.

This invention relates to spring wheels, and more especially to that type of wheel in which the requisite resilience is obtained by the employment of spring spokes that are connected at their opposite ends to the rim and hub elements.

It consists in certain improvements in the construction and arrangement of the spokes, and in the provision of improved devices for effecting a simultaneous adjustment of all of the spokes, to regulate the tension thereof and to facilitate the application of the tire to the rim.

A structural embodiment of the invention is illustrated in the accompanying drawings, whereof—

Figure 1 is a side elevation of the improved wheel, with the cap omitted; Fig. 2 is an enlarged vertical section taken, substantially, on the line 2—2 of Fig. 1; Fig. 3 is an enlarged fragmental plan view of the rim, showing one of the stays employed in connection therewith; Fig. 4 is a perspective view of one of the spokes; Fig. 5 is a detail view showing the mounting of the spoke adjusting devices; and Fig. 6 is a detail view of one of the links of which the rim is composed.

As shown in said drawings, the wheel consists, essentially, of the following parts, viz., the hub 5, spokes 6, rim 7 and tire 8. The first-mentioned part comprises a collar 9, through which the adjacent end of the axle 10 is adapted to pass, and front and rear annular face plates 11 and 12. Said plates are connected together by bolts 13, or any other suitable fastening devices, and the rear plate is fitted directly upon the collar in contact with the flange 35 formed thereon, and between the latter and a sleeve or washer 14 which is also fitted upon said collar. The aforesaid collar 9 is formed with a series of seats 15, wherein are rotatably disposed the inner ends of a series of threaded bolts or screws 16, displacement of said screws being prevented by means of keys 17 secured in seats 37 in the peripheral wall of the collar intersecting said seats 15 and projecting into circumferential grooves 18 formed in the screws, as depicted in Fig. 5. The outer portions of these screws fit in threaded sockets 19 formed in the inner portions of the spokes, in order to produce an endwise movement of the latter when the screws are rotated, as hereinafter described.

In the preferred form of the invention, the spokes are constructed of steel and each comprises a relatively wide, flat, springy, outer portion or tongue 20 which is finely tempered, and a rigid rectangular body portion or shank 21; the sockets 19 above referred to are located in the inner ends of the shanks, and said shanks are disposed between the face plates 11 and 12, and thus braced against lateral movement, the spaces between the shanks of adjacent spokes being occupied by suitable filling blocks 36 through which the bolts 13 are passed. The flat tongue portions of the spokes press directly against and are connected with rim 7, so as to maintain that element, which is extremely flexible, taut under all conditions. Said element, in the construction illustrated, consists of a series of rows of links 22 interwoven or connected together after the manner of chain mail; these links are bent inwardly or outwardly, as the case may be, at the points where they cross one another, and as a result the surfaces of the band thus produced are rendered as nearly as possible smooth or flat. The outer surfaces of the spoke tongues 20 contact with the inner surface of the flexible band or rim, as will be understood, and are fastened thereto by means of flat headed bolts 23 that are passed through the links 22 and through registering openings formed in the tongues and in a series of transversely-arranged metal stays 24 disposed against the outer surface of the rim. The stays may also be utilized, if desired, to hold the solid rubber tire in place, to which end they may be formed with laterally-projecting terminal flanges 25 that engage the tire at opposite sides, these flanges extending inwardly across the edges of the rim, as well as outwardly against the tire; see Figs. 1 and 2.

As above stated, rotation of the screws 16 will produce an endwise movement of the spokes, thereby varying the tension of their tongues upon the rim. To rotate said screws, preferably in synchrony, there is provided a main operating bevel gear 26 that meshes with a small bevel gear 27 secured to each screw 16. Gear 26 is loose upon the outer end of collar 9, its hub 29 being provided with seats 30 for the jaws of a spanner wrench or similar implement, by means of which it may be turned. Said hub is encircled by the outer face plate 11, and its seats 30 are normally covered by a locking nut 31 which is threaded on collar 9 and is adapted to be tightened against the face of the hub. The projecting end of the axle is provided with the usual clamping nut 32 and dust cap 33, a thin washer 34 being preferably interposed between the two clamping nuts 31 and 32.

It will be seen from the foregoing that the arrangement of the various parts is such as to enable all of the spokes to be moved endwise simultaneously in the same direction by rotating the main gear 26 when the cap and clamping nut have been removed. This adjustment of the spokes serves to vary the pressure which they exert upon the flexible rim, the pressure being distributed evenly over the entire wheel. With reference to the spokes, it may be stated that only the tongue portions thereof are resilient, the shank portions being sufficiently rigid to exert a positive traction when the wheel is in motion; the spoke tongues must be bent in order to permit them to be assembled in the proper manner, thus insuring the required pressure being exerted upon the rim.

I claim as my invention:

1. In a wheel, the combination, with a hub and a flexible rim; of a series of endwise-adjustable spokes having rigid stems connected to said hub, and spring tongues connected to said rim; and means engaged with the stems of all of said spokes for adjusting the latter simultaneously in the same direction.

2. In a wheel, the combination with a hub and a flexible rim; of a series of spokes permanently occupying a common plane disposed at right angles to said hub and adjustable endwise in such plane; and means engaged with the stems of all of said spokes for adjusting the latter simultaneously in the same direction.

3. In a wheel, the combination, with a hub and a flexible rim; of a series of endwise-adjustable spokes connecting said hub and rim, each spoke having a threaded axial socket formed in its inner end; a series of radiating screws revolubly carried by said hub and projecting into said sockets; a gear attached to each screw; and a main operating gear revolubly connected with said hub and meshing with all of the first-named gears, for rotating the same in unison, to simultaneously adjust all of said spokes.

4. In a wheel, the combination, with a hub and a flexible rim; of a series of endwise-adjustable spokes having spring tongues connected to said rim, and rigid stems formed with threaded axial sockets; a series of radiating screws revolubly carried by said hub and projecting into said sockets; a gear attached to each screw; and a main operating gear revolubly connected with said hub and meshing with all of the first-named gears, for rotating the same in unison, to simultaneously adjust all of said spokes.

5. In a wheel, the combination, with a hub and a flexible rim; of a series of spokes movable endwise bodily and connecting said hub and rim; a series of radially-disposed members carried by said hub and engaged individually with the inner ends of the individual spokes; and means for operating all of said members in unison, to simultaneously move all of said spokes.

6. In a wheel, the combination, with a hub and a flexible rim; of a series of spokes movable endwise bodily and connecting said hub and rim; a series of radially-disposed rotatable members carried by said hub and operatively engaged individually with the inner ends of the individual spokes; and means for rotating all of said members in unison, to simultaneously move all of said spokes.

In testimony whereof I have hereunto set my hand in presence of two subscribing witnesses.

JAMES A. GLENN.

Witnesses:
CHESTER H. PETRIE,
H. C. BROWN.

---

Copies of this patent may be obtained for five cents each, by addressing the "Commissioner of Patents, Washington, D. C."